United States Patent

[11] 3,568,038

[72] Inventors Ray H. Enders
Columbia, Pa.;
Henri H. Hoge, Baltimore, Md.; Robert E. Lewis, Peach Bottom, Pa.
[21] Appl. No. 811,520
[22] Filed Mar. 28, 1969
[45] Patented Mar. 2, 1971
[73] Assignee Schick Electric Inc.
Lancaster, Pa.

[54] TRANSISTOR INVERTER CIRCUIT
9 Claims, 2 Drawing Figs.
[52] U.S. Cl. .................................................. 321/47, 331/112
[51] Int. Cl. ....................................................... H02m 7/12
[50] Field of Search .......................................... 321/2, 43, 47; 331/108, 112, 146

[56] References Cited
UNITED STATES PATENTS

| | | | |
|---|---|---|---|
| 2,854,614 | 9/1958 | Light............................ | 321/2 |
| 2,879,480 | 3/1959 | Reed............................ | 331/108X |
| 2,915,710 | 12/1959 | Schiewe et al. ............... | 321/2X |
| 2,955,213 | 10/1960 | Schaeve ....................... | (331)/(112) |
| 3,012,205 | 12/1961 | Brown.......................... | 321/2X |
| 3,161,837 | 12/1964 | Lloyd........................... | 321/2X |
| 3,302,131 | 1/1967 | Pyatt............................ | 331/112 |
| 3,316,445 | 4/1967 | Ahrons......................... | 321/2X |

*Primary Examiner*—William M. Shoop, Jr.
*Attorney*—Kane, Dalsimer, Kane, Sullivan & Kurucz ABSTRACT: A transistor circuit capable of receiving a high voltage, low frequency supply and changing it to a low voltage high frequency supply.

INVENTORS
RAY H. ENDERS
HENRI H. HOGE
ROBERT E. LEWIS
BY
ATTORNEYS

TRANSISTOR INVERTER CIRCUIT

BACKGROUND OF THE INVENTION

In the appliance industry low voltages are generally used to power the devices. In some instances the appliance is powered by a small DC motor driven from line voltage or in the alternative from storage cells. When the motor is driven from line, means must be provided for changing the low frequency, high voltage line current to low voltage DC. When storage cells are used as in "cordless" devices, means must be provided for charging the cells at a slow rate from line current. It has been found advantageous in "cordless" appliances to provide circuitry having the dual capability of providing means for driving a low voltage DC motor from line or storage cells while also providing means for charging the cells.

A suitable circuit however, capable of receiving AC line voltage and developing a low DC current for recharging a battery or developing a high DC current for directly energizing a DC motor has not been available prior to this invention. One solution in the prior art utilizes a line transformer that reduces the service voltage to the required low voltage DC to operate the device. This however, due to the transformer, renders the device bulky, heavy and unsightly and violates the principle that all operating components of an equipment should be housed within the equipment.

Even where there is no motor or storage cell present, the changing of line voltage to low voltage when accomplished by use of transformers is unsatisfactory due to bulk and weight requirements. This problem is also present where a cell-driven device which must be recharged is utilized in the absence of an electric motor.

The problem essentially becomes one of providing a suitable means to reduce the line voltage without the use of a conventional (or line frequency) transformer. If conversion to DC is then required to drive a DC motor or to charge storage cells this can then be accomplished.

SUMMARY OF THE INVENTION

A circuit for changing a low frequency, high voltage AC input supply to a high frequency, low voltage AC including transistor means, rectification means to convert the low frequency, high voltage AC input to suitable DC transistor supply voltage for the transistor means and feedback means associated with the transistor means to furnish a portion of the output voltage of the transistor means as an input to the transistor means to maintain high frequency oscillation of the transistor means, said feedback means including inductive coupling between the input and output of the transistor means.

DESCRIPTION OF THE PREFERRED EMBODIMENTS

Figure 1:
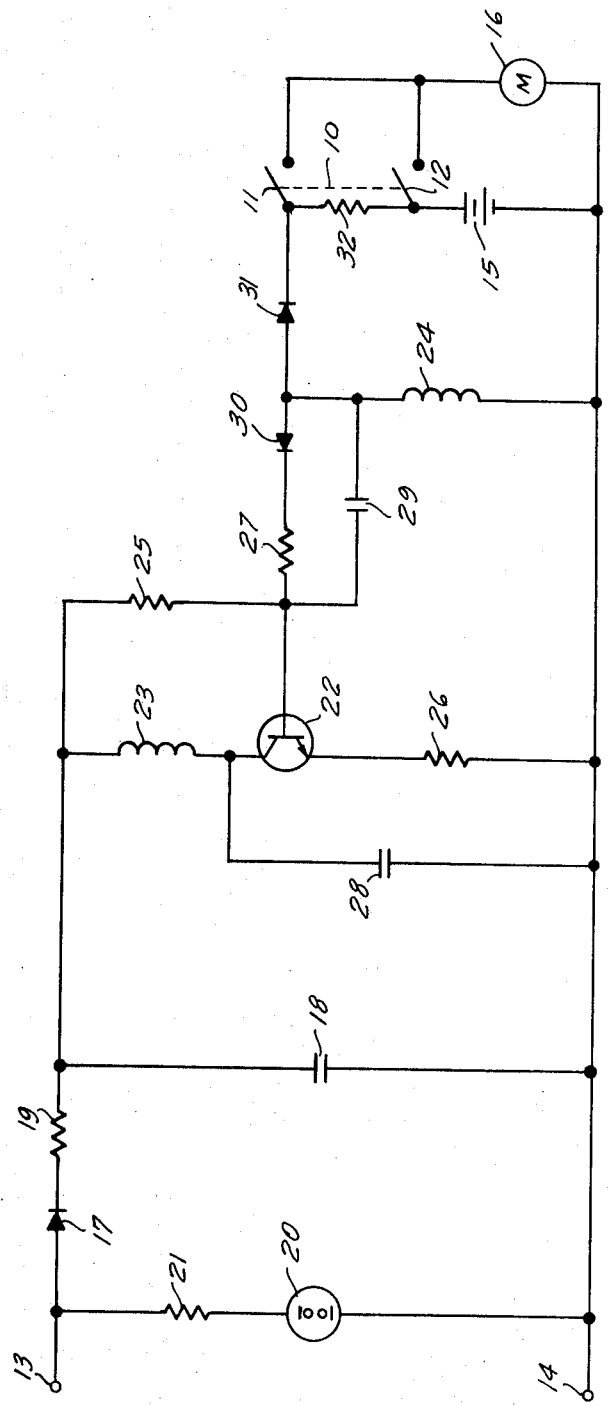
FIG. 1 is a schematic of a circuit constructed in accordance with the teachings of this invention utilizing a single transistor.

In FIG. 1 switch 10 is a double-pole, double-throw switch with its contacts 11 and 12 shown in the open position. This is the battery charge position. In this switch position, if line voltage (115v. 60 cycle, AC) is applied across terminals 13 and 14, the battery 15 will have supplied thereto low charging current with motor 16 deenergized. If switch 10, however, is in closed position, the motor 16 can be operated directly from the battery 15 since switch 10 in closed position puts them directly in circuit. Diode 17 together with capacitor 18 provides a half-wave rectifier. Resistor 19 is a current limiting resistor and in combination with capacitor 18 forms a low-pass filter to provide transient protection for the remainder of the circuit. There will therefore appear across the capacitor 18 the peak AC voltage applied, which is usually equal to 1.4 times 115v. RMS minus the voltage drop across resistor 19 and across diode 17 due to its forward resistance.

Neon lamp 20 in series with limiting resistor 21 provides a visual indication that the circuit is connected to the line.

The capacitor 18 and diode 17 supply DC power to the high frequency saturating core oscillator consisting of transistor 22, coil windings 23 and 24, resistors 25, 26 and 27, capacitors 28 and 29, and diode 30. The coils 23 and 24 are wound on the same core.

When the unit is "plugged in" AC line voltage is applied to terminals 13 and 14 and a DC voltage is applied to the oscillator. Current flows through resistor 25 to the base-emitter circuit of transistor 22 causing current to flow in the collector-emitter circuit of the transistor. Current then flows in coil 23. The current flowing in coil 23 is an increasing DC current which induces an increasingly stronger unidirectional flux field in coil 23 which—as it builds up—induces an increasing unidirectional or DC voltage in coil 24—the feedback winding—which in turn supplies current to the base-emitter circuit to continue the increase in transistor collector current. Since the core of coil 23 is a saturable material, the unidirectional flux increases until the core becomes saturated and the current flowing therein has achieved a predetermined substantially constant level. Since at saturation the current is no longer increasing in value but has become constant, the flux field surrounding coil 23 discontinues its buildup. The discontinuance of the cutting of flux lines causes the flux field surrounding coil 23 to decrease and this movement of flux in the opposite direction causes a reversal in polarity of the voltage being induced thereby at coil 24 causing the transistor to turn off.

It is the achievement of the substantially constant current level in coil 23 due to the saturation of the coil core which causes cutoff. In the absence of a saturable core this constant level of current will be achieved when the gain of the transistor is exceeded and the current flow is limited to a constant level by the action of the transistor. In an application utilizing a saturable core for coil 23 the gain of the transistor must be sufficiently high to allow the reactor core to determine the point of cutoff.

Upon the transistor being turned off the energy stored in the coil 23 is released through capacitor 28 until the current reaches zero at which time the transistor switches on again. This is continually repeated as long as the circuit is "plugged in" to the AC line and line voltage is applied to terminals 13 and 14.

Resistors 26 and 27 limit the base current in transistor 22 to acceptable levels and resistor 26 also helps stabilize transistor gain. Diode 30 blocks the flow of bias current through the winding 24 and enables better starting of the inverter. Capacitor 29 provides a low impedance path at high frequencies to speed up switching of the transistor. The capacitor 29 provides an AC path while the resistor 27 in series with diode 30 provides a DC path. Winding 24 not only provides feedback but also supplies current to charge the battery 15 and supply the motor 16 depending of course upon the position of switch 10.

When current flows in coil 23, a voltage is induced in winding 24 which upon exceeding the battery terminal voltage with switch 10 open will cause current to flow through diode 31 and resistor 32 into battery 15. The amount of current flowing in the charge mode—that is, with switch 10 open—is determined by resistor 32.

When the contacts 11 and 12 are closed by closing of switch 10 and the line voltage across terminals 13 and 14 resistor 32 is no longer in the circuit and the inverter can supply the much higher current necessary to energize the load which is motor 16. In this mode the battery is used as a capacitor to filter the inverter output.

Of course, with the battery 15 in charged condition and switch 10 closed without an AC line voltage across terminals 13 and 14, the motor 16 will be energized and driven by the current discharge from the battery 15.

In this circuit as shown in FIG. 1, therefore, the motor 16 can be operated directly from line or from battery 15 when the battery has sufficient charge. In either case the switch 10 is closed. If with switch 10 closed no AC voltage is applied to terminals 13 and 14 the motor will be driven directly from battery 15 is the battery has sufficient charge to perform this function. If, however, with switch 10 closed an AC line voltage is applied across terminals 13 and 14, the motor will be driven through the inverter and the battery will function as a capacitor. If however, it is desired to recharge the battery, line voltage is applied across terminals 13 and 14 with the switch 10 in the open position as shown in FIG. 1.

Figure 2:
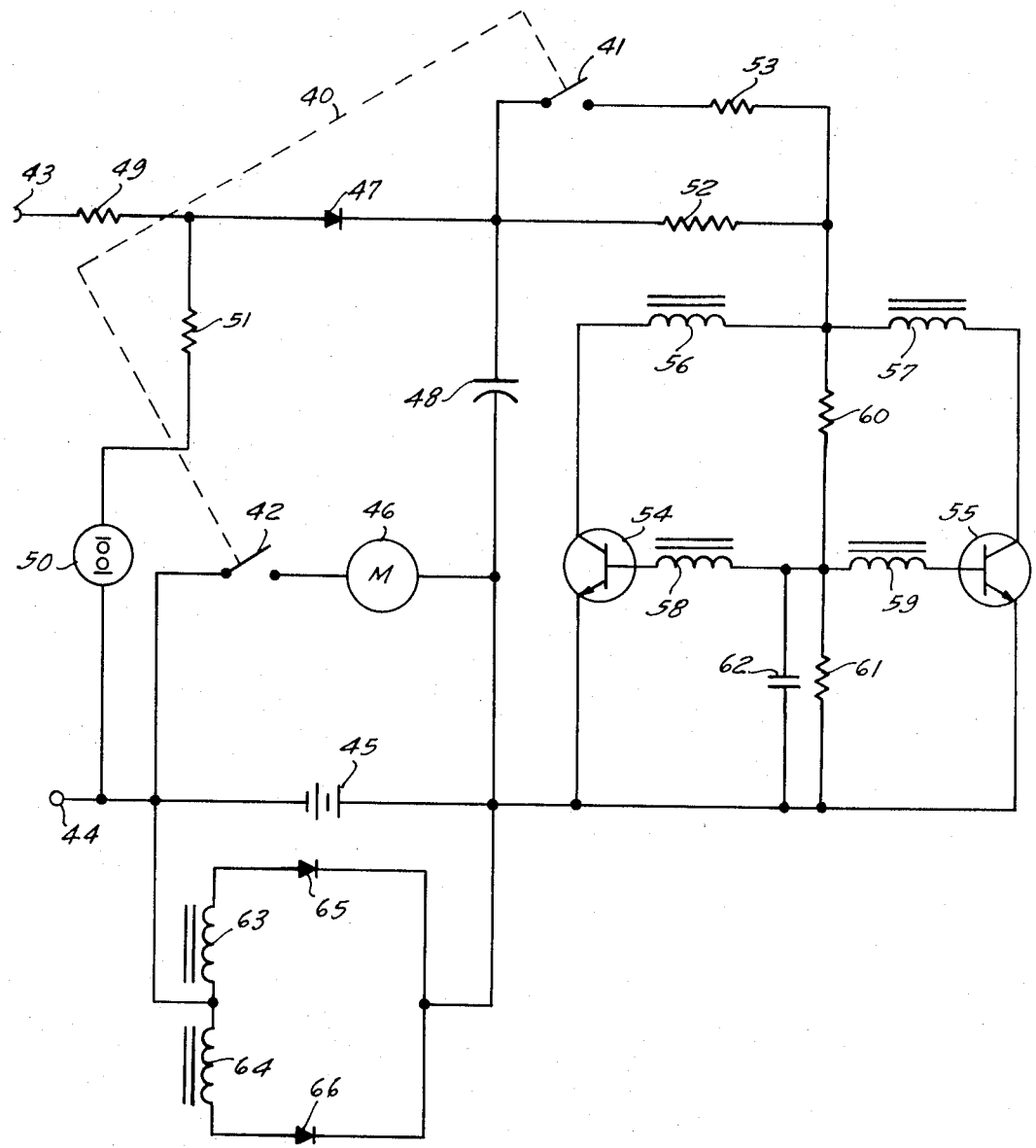
FIG. 2 is a schematic of a circuit of a second form of the invention utilizing a pair of transistors in "push-pull" operation.

In FIG. 2 a circuit embodying the invention is shown in which a pair of transistors are utilized in push-pull operation. The circuit functions essentially in the same manner as the circuit of FIG. 1. However, as is well known in the art, a more efficient operation can be obtained through use of the well-known push-pull technique.

In FIG. 2 switch 40 is also a double-pole, double-throw switch with its contacts 41 and 42 shown in the open or battery charge position. In this switch position, if line voltage is applied across terminals 43 and 44 the battery 45 will have supplied thereto low charging current with motor 46 deenergized. If switch 40 is in closed position the motor 46 can be operated directly from the battery 45 since contacts 41 and 42 in closed position put them directly in circuit. If line voltage is available and the contacts are closed the motor will be energized by DC directly and battery 45 functions as a capacitor to filter AC.

Diode 47 together with capacitor 48 provides a half-wave rectifier. Resistor 49 is the current limiting resistor and in combination with capacitor 48 forms a low-pass filter to provide transient protection for the remainder of the circuit. There will therefore appear across the capacitor 48 the peak DC voltage applied.

Neon lamp 50, in series with limiting resistor 51, provides a visual indication that the circuit is connected to the line.

The capacitor 48 and diode 47 supply DC power through resistor 52 in charge mode and through the parallel combination of resistors 52 and 53 in the motor run mode to the high frequency saturating core oscillator consisting of transistors 54 and 55, coil windings 56, 57, 58 and 59, resistors 60 and 61 and capacitor 62. The coils 56, 57, 58 and 59 are wound on the same core.

When the unit is "plugged in," AC line voltage is applied to terminals 43 and 44, and current flows through resistor 60 causing current to flow in the base-emitter circuit of the transistor with the higher gain, transistor 54 for instance. This in turn causes current to flow in the collector-emitter circuit of transistor 54 through coil 56.

This starts a fast switching operation where the collector-emitter voltage of transistor 54 decreases rapidly toward saturation causing a rapid rise in voltage across coil 56 and at the same time inducing a feedback voltage in coil 58 to continue the transition toward saturation. The current in coil 56 will continue to increase constantly until the core saturates at which time a very rapid increase will occur until a maximum value is attained where the transistor 54 starts out of saturation. At the time transistor 54 starts out of saturation, all of the coil voltages start to decrease and then reverse, turning transistor 54 off and inducing a positive voltage on coil 59 turning transistor 55 on. Action in transistor 55 will then proceed in the same manner as has been described with respect to transistor 54.

This action is continually repeated except that the core upon which the coils are wound is driven in a different direction when transistor 55 is conducting than when transistor 54 is conducting. This same operation occurs in both the low current battery charge and high current motor run modes of operation.

The output circuit consists of coils 63 and 64 and diodes 65 and 66 across battery 45. Coils 63 and 64 which are wound on the same core as are coils 56 and 57, supply high frequency AC voltage induced from the primary to diodes 65 and 66 which full wave rectify the voltage and apply it to the battery 45 or motor 46.

If switch contacts 41 and 42 are open, the primary inverter current is limited and the current supplied to the battery is low and used for charging. During charging the resistor 52 which is of relatively high resistance is the current limiting resistance which determines the charging current to the battery from the output circuit. Decreasing the ohmic value of resistor 52 will increase the amount of current fed to battery 45.

When the switch is closed, the primary currents are high inducing much higher currents to the secondary where switch contact 42 has connected the motor load. In this mode, battery 45, when discharged, remains in the circuit and is used as a capacitor to filter the inverter output and the inverter supplies the power to operate the motor.

The motor can be operated when line voltage is available and placed across terminals 43 and 44 or the motor can be energized directly from battery 45 without the availability of line voltage. In either case the switch 40 must be closed to operate the motor.

Since it is desirable that the circuit provide a greater DC current output when the motor is driven from the oscillator than when the oscillator is charging battery 45, resistor 53 is provided in series with contact 41 of switch 40. Closing switch 40 also closes contact 41, placing the resistor 53 in parallel with resistor 52. Resistor 53 is of a relatively low value, thus the ohmic value of the current limiting or charge controlling resistor is reduced to provide a higher level output DC current from the rectifier formed by diodes 65 and 66.

The motor can be operated without the battery acting as a filter, but efficiency would be impaired. Another feature of this circuit is the improvement in efficiency obtained by routing the inverter input current through the battery avoiding some of the inherent inverter loss.

We claim:

1. A transistor inverter circuit including a transistor, a DC current supply, a first coil in the collector-emitter circuit of said transistor and connected with said DC current supply, a second coil in the base-emitter circuit of said transistor within the filed of said first coil, first DC current flow in the base-emitter circuit of said transistor, first means for initiating said first current flow, second current flow from said DC current supply in the collector-emitter circuit of said transistor responsive to said first current flow, first flux generated in said first coil by said second current flow, a first voltage induced in said second coil by said first flux, said first voltage increasing the value of said first current flow whereby the value of said second current flow is increased, a predetermined substantially constant level of second current flow, second means for causing said second current flow to be restricted to said constant level, said first flux field beginning to decrease at said constant level of said second current flow, said decrease in said first flux field causing a reversal in polarity of said first voltage and cutoff of said transistor, and load means operatively connected to said second coil and supplied by current generated by the voltage developed across said second coil.

2. A transistor inverter circuit in accordance with claim 1 in which said first coil is wound on a saturable core which provides the means for causing said second current flow to be restricted to said constant level at core saturation.

3. A transistor inverter circuit in accordance with claim 1 in which a capacitor is provided in the collector-emitter circuit of said transistor having one terminal thereof connected between the collector of said transistor and said first coil and the remaining terminal thereof connected to ground whereby upon the transistor being turned off energy stored in said first coil is released.

4. A transistor inverter circuit in accordance with claim 1 in which the means for initiating said first current flow is current from said DC current supply.

5. A circuit for changing an AC input voltage to a DC current including a transistor oscillator, a transformer core of said oscillator, a first rectifier receiving said AC input voltage, a resistor coupling the output current of said first rectifier to said oscillator as a DC supply, a second rectifier, said second rectifier having input coils wound on said transformer core for coupling with said oscillator and a DC load supplied by the output of said second rectifier, first switching means for changing the resistance of said resistor whereby the output current of said second rectifier is changed, and second switching means in said DC load and coupled to said first switching means whereby said DC load is changed simultaneously with said output circuit.

6. A transistor inverter circuit including in combination a transistor, a first coil in the collector-emitter circuit of said transistor, a second coil in the base-emitter circuit of said transistor and positioned to be within the flux field of said first coil, a resistor connected to the base of said transistor to provide a supply current path thereto, and load means operatively connected to said second coil and supplied by current generated by the voltage developed across said second coil and a capacitor connected at one end between said first coil and the collector of said transistor to provide a path to ground.

7. A transistor inverter circuit including in combination first and second transistors, first and second coils, said first coil being connected at its one end to the base of said first transistor and at its remaining end to said second coil, said second coil being connected at its remaining end to the base of said second transistor, a first resistor connected at one end to said first and second coils whereat said coils are connected to each other to provide a path to ground, a second resistor connected at one end to said first and second coils whereat said coils are connected to each other to provide a supply current path, third and fourth coils, said third coil being connected at its one end to the collector of said first transistor and at its remaining end to said fourth coil, said fourth coil being connected at its remaining end to the collector of said second transistor, said second resistor being connected at its remaining end to said third and fourth coils whereat said coils are connected to each other, said coils being wound on the same core.

8. A transistor inverter circuit including a transistor, a DC current supply, a first coil in the collector-emitter circuit of said transistor and connected with said DC current supply, a second coil in the base-emitter circuit of said transistor within the field of said first coil, first DC current flow in the base-emitter circuit of said transistor, first means for initiating said first current flow, second current flow from said DC current supply in the collector-emitter circuit of said transistor responsive to said first current flow, first flux generated in said first coil by said second current flow, a first voltage induced in said second coil by said first flux, said first voltage increasing the value of said first current flow whereby the value of said second current flow is increased, a predetermined substantially constant level of second current flow, second means for causing said second current flow to be restricted to said constant level, said first flux field beginning to decrease at said constant level of said second current flow, said decrease in said first flux field causing a reversal in polarity of said first voltage and cutoff of said transistor, a battery, and means for rectifying the current generated by the voltage developed across said second coil and feeding it to charge said battery.

9. A transistor inverter circuit in accordance with claim 8 in which a motor is provided and switching means whereby said motor is placed in circuit parallel with said battery.